UNITED STATES PATENT OFFICE.

JOSEPH SCHÖN, OF REICHENBACH, SILESIA, PRUSSIA, GERMANY.

MANUFACTURE OF INFRANGIBLE DOLL OR PUPPET HEADS.

SPECIFICATION forming part of Letters Patent No. 361,453, dated April 19, 1887.

Application filed December 14, 1886. Serial No. 221,576. (No specimens.)

*To all whom it may concern:*

Be it known that I, JOSEPH SCHÖN, a citizen of the Kingdom of Prussia, Germany, residing in Reichenbach, Silesia, in the said Kingdom of Prussia, have invented certain new and useful Improvements in the Manufacture of Infrangible Doll or Puppet Heads, of which the following is a specification.

My invention relates to the manufacture of doll-heads, of which a full and clear description will be given hereinafter.

My invention consists of the method of manufacturing doll-heads by first pressing sheet metal into the shape of a head, in halves or any number of parts, as may be advisable, then riveting or soldering them together properly, and then coating them with enamel impervious to moisture, thus completing the article, which will stand rough handling without becoming defaced.

Heretofore doll-heads were made of a plastic substance, which was poured into a mold and left there until dry, after which they were colored with paint or covered with wax. Dolls of this character, being very frail, would not stand rough handling.

With my invention I propose to furnish an article that will equal all others in appearance, and be more durable and cheaper in every respect.

Having thus described my invention, what I claim as new, and desire to secure by Letters Patent, is—

The method of manufacturing doll-heads by first pressing sheet metal into the shape desired, in halves or any number of parts, then riveting or soldering them together, and coating them with enamel, substantially as shown and described.

In testimony whereof I hereunto sign my name, in the presence of two subscribing witnesses, this 15th day of November, 1886.

JOSEPH SCHÖN.

Witnesses:
HEINRICH FOCKE,
HENRY DITHMAR.